United States Patent [19]

Shibayama

[11] Patent Number: 5,317,621
[45] Date of Patent: May 31, 1994

[54] MULTI-ADDRESS RADIO DISPLAY PAGER
[75] Inventor: Hiroaki Shibayama, Tokyo, Japan
[73] Assignee: NEC Corporation, Tokyo, Japan
[21] Appl. No.: 811,304
[22] Filed: Dec. 20, 1991
[30] Foreign Application Priority Data
  Dec. 20, 1990 [JP] Japan .................. 2-412534
[51] Int. Cl.⁵ .................... H04M 11/00; H04M 1/64; G08B 5/22
[52] U.S. Cl. ........................ 379/57; 379/58; 379/67; 340/825.44
[58] Field of Search ............ 379/57, 58, 67; 340/825.44, 825.48, 825.72

[56] References Cited
U.S. PATENT DOCUMENTS

| | | | |
|---|---|---|---|
| 4,477,807 | 10/1984 | Nakajima et al. | 340/825.48 |
| 4,818,987 | 4/1989 | Ide et al. | 340/825.48 |
| 5,066,949 | 11/1991 | Breeden et al. | 340/825.44 |
| 5,095,307 | 3/1992 | Shimura et al. | 379/57 |
| 5,142,699 | 8/1992 | Sato et al. | 340/825.44 |

FOREIGN PATENT DOCUMENTS 0155628 9/1985 European Pat. Off. .
0228874 7/1987 European Pat. Off. .
9201352 1/1992 World Int. Prop. O. ........... 379/57

OTHER PUBLICATIONS

Telephony "With Swedish paging system, you're only a phone call away", Makitalo, vol. 198, No. 21, May 26, 1980, pp. 82-88.

Primary Examiner—Stephen Chin
Assistant Examiner—Vijay Shankar
Attorney, Agent, or Firm—Sughrue, Mion, Zinn, Macpeak & Seas

[57] ABSTRACT

In a radio display pager, a paging signal from a transmitter station is received and checked by a decoder to see if it contains a pager's first identifier or a pager's second identifier. The first and second identifiers are respectively followed by a caller's telephone number and a sequence of caller's message codes. If the decoder determines that the paging signal contains the first identifier, the caller's telephone number is displayed and if it determines that the paging signal contains the second identifier, the subsequent message codes are used as address pointers to read alphanumeric data from a memory to reconstruct a caller's message, which is displayed.

2 Claims, 3 Drawing Sheets

MULTI-ADDRESS RADIO DISPLAY PAGER

BACKGROUND OF THE INVENTION

The present invention relates generally to radio display pagers, and more specifically to a radio display pager capable of displaying callers' messages.

According to conventional radio display paging systems, a destination pager's identifier, or telephone number, is dialed to the public switched telephone network (PSTN) to access a voice response unit 30 of a paging system (FIG. 1). The voice response unit urges the caller to send either his or her own telephone number or a message. If the caller's telephone number is to be displayed, it is dialed by the caller and the dialed information is passed through a selector 31 to a store and forward circuit 32 in which it is stored. The store and forward circuit 32 receives the pager's identifier from the PSTN and forwards the dialed information and the received pager's identifier to a transmitter 33 in which it is converted to a specified line code, which is broadcast from antenna 35. On receiving the transmitted signal, the pager checks to determine if the pager identifier contained in the signal matches the pager's individual identifier, and if it does, the pager displays the caller's telephone number. If the caller's message is to be displayed, on the other hand, the caller dials two symbol marks (asterisks) in sequence and then a sequence of sentence codes signifying letters and numerals. The selector analyzes the two asterisks and knows that the dialed codes following the asterisks comprise a message, and passes the dialed information to a store, convert and forward circuit 34 in which the two asterisks are converted to other symbols ("--"). On receiving the pager's identifier from the PSTN, the circuit 34 applies the pager's identifier, the converted symbols ("--") and the message to the transmitter. On receiving this signal, the pager knows that the codes following the symbols "--" are a message and uses them as an address pointer for accessing a memory in which sentence patterns and alphanumeric data are stored.

However, users of this type of paging system are required to additionally dial special symbols when calling in a message display mode and the paging system is required to distinguish the message display mode from other display modes.

SUMMARY OF THE INVENTION

It is therefore an object of the present invention to allow users to establish radio paging call without dialing additional symbols.

According to the present invention, each paging user is assigned two addresses, or identifiers to be used for different display modes respectively. The radio display pager of this invention comprises a receiver, or front end for receiving a paging signal from a transmitter station. A decoder is coupled to the receiver for determining whether the received paging signal contains a pager's first identifier or a pager's second identifier. A caller's identifier following the pager's first identifier is displayed on a display unit if the decoder determines that the received paging signal contains the pager's first identifier. Message data is read out of a memory according to a message identifier following the pager's second identifier to reconstruct a message if the decoder determines that the received paging signal contains the pager's second identifier and the message is displayed on the display unit.

According to a second aspect of this invention, a method is provided for a paging system. According to this method, a caller is allowed to dial a pager's first identifier to a switched telephone network during a first display mode, or a pager's second identifier during a second display mode to establish a connection from the caller to the paging system. A voice response is returned to the caller from the paging system urging the user to send a caller's identifier or a message identifier. The paging system receives the pager's first or second identifier from the network and the subsequent identifier from the caller and broadcasts the received identifiers in a specified line code format as a paging signal. On receiving the paging signal a pager determines whether the paging signal contains the pager's first identifier or second identifier. If it determines that the paging signal contains the pager's first identifier, it displays the caller's identifier, and if it determines that it contains the pager's second identifier, it reads message data from a memory according to the message identifier to produce a message and displays the message.

BRIEF DESCRIPTION OF THE DRAWINGS

The present invention will be described in further detail with reference to the accompanying drawings, in which.

DETAILED DESCRIPTION

Figure 2:
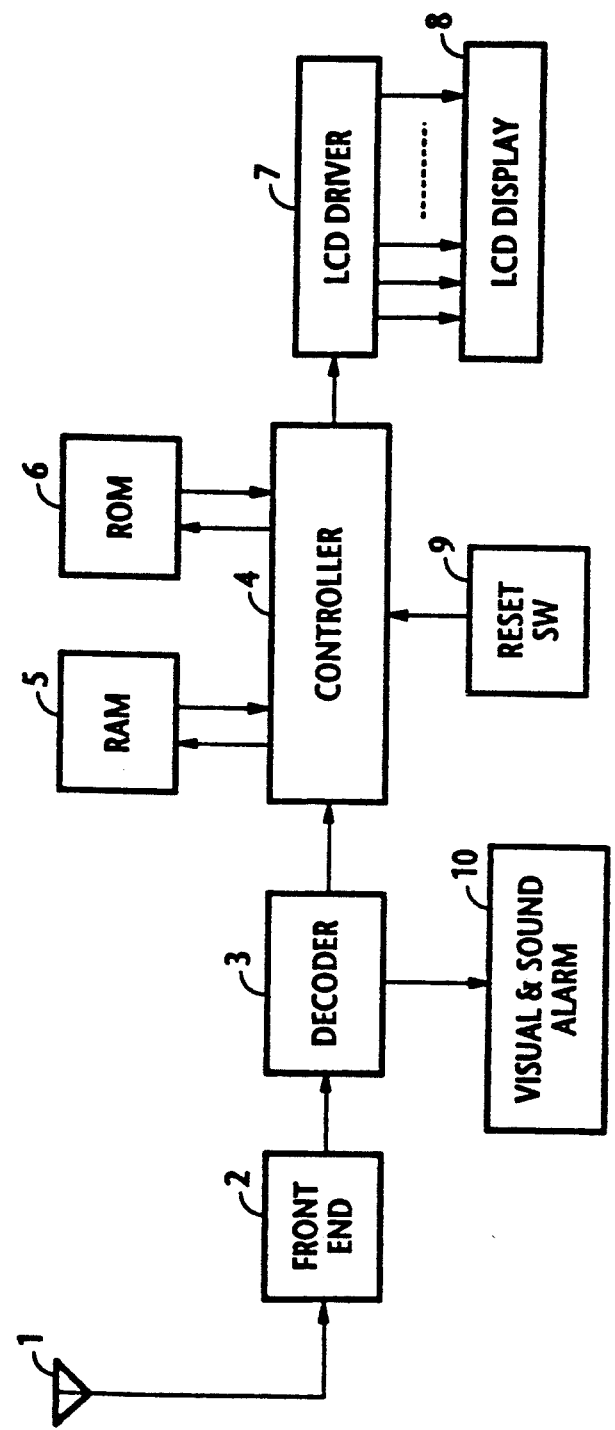
FIG. 2 is a block diagram of a radio pager of the present invention.

Referring now to FIG. 2, there is shown a multi-address radio display pager according to the present invention. The user of this pager is assigned two addresses, or identifiers #1 and #2. Identifier #1 is used for a caller's identifier #2 is used for a message display mode in which the source user's message is displayed. The pager comprises a front end 2 for receiving transmitted radio-frequency paging signals through antenna 1 for conversion to baseband signals. A decoder 3 is coupled to the output of the front end 2 to detect a match or mismatch between the identifier contained in a received paging signal and each of identifiers #1 and #2. On receiving a paging signal that is addressed to the pager, a visual and sound alarm unit 10 is activated by decoder 3 to notify the user of the arrival of a call.

A controller 4 is coupled to the output of decoder 3 to receive a signal following the pager's identifier #1 or #2. Controller 4 is associated with a random access memory 5 for storing the received message signal. Controller 4 is further associated with a read only memory 6 in which alphanumeric data, symbols, message patterns and proper nouns are stored. Controller 4 accesses the ROM according to received codes for reconstructing a message during a sentence display mode. A liquid crystal display unit 8 is coupled to the output of controller 4 by way of an LCD driver 7. A reset switch 9 is operated when the user is alerted.

Figure 3:
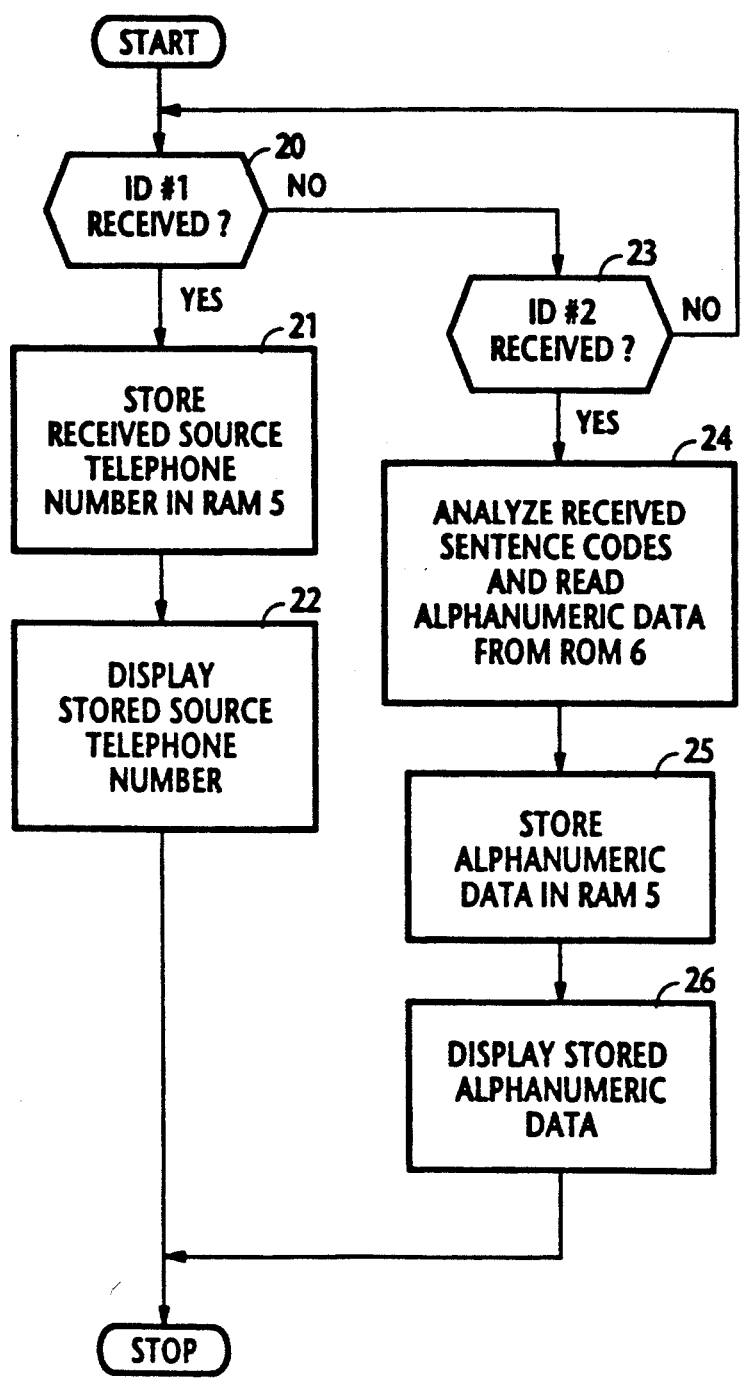
FIG. 3 is a flowchart describing a sequence of steps performed by the controller of FIG. 1.

FIG. 3 shows a sequence of steps to be performed by the controller 4 of the pager. The program execution starts with step 20 which checks to see if the pager is in receipt of the identifier #1 of the pager. If it is, control proceeds to step 21 to store in RAM 5 a source telephone number which is subsequently received from the network and decoded by decoder 3. Control then advances to step 22 to display the telephone number stored in RAM 5.

If the answer is negative in decision step 20, control branches to step 23 to check to see if the identifier #2 has been received. If the answer is negative, control returns to step 20 to repeat the search loop, and if the answer is affirmative, program execution branches at step 23 to step 24 to analyze sentence codes which are subsequently received from the network and decoded by decoder 3. Using the analyzed codes as address pointers, controller 4 reads corresponding alphanumeric data from ROM 6 into RAM 5 (step 25). Exit then is to step 26 to display the stored alphanumeric data.

Figure 1:
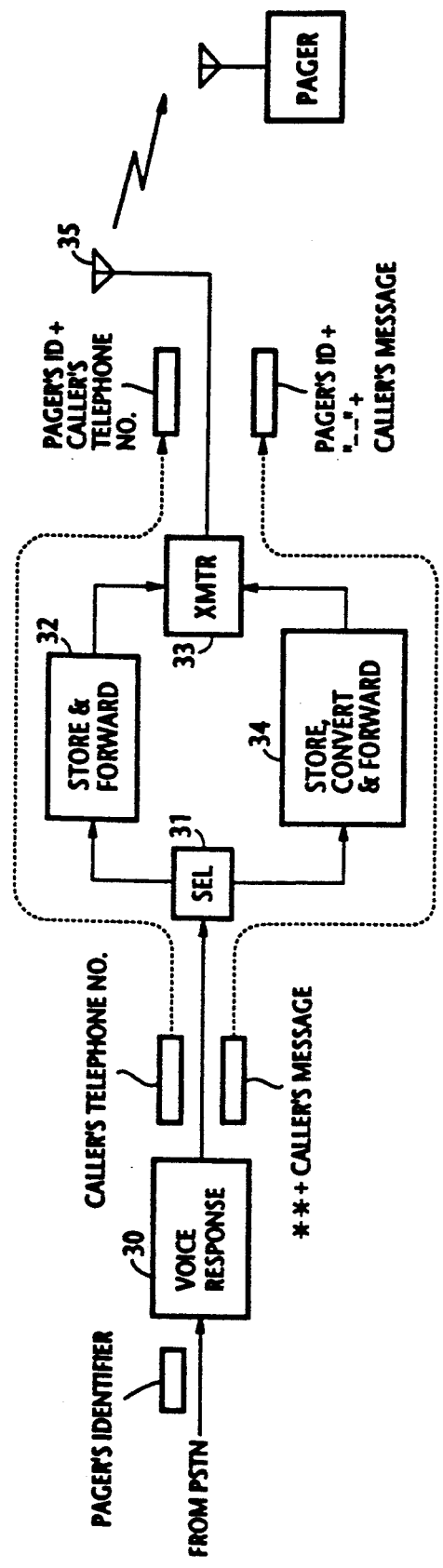
FIG. 1 is a block diagram of a conventional radio paging system.
Figure 4:
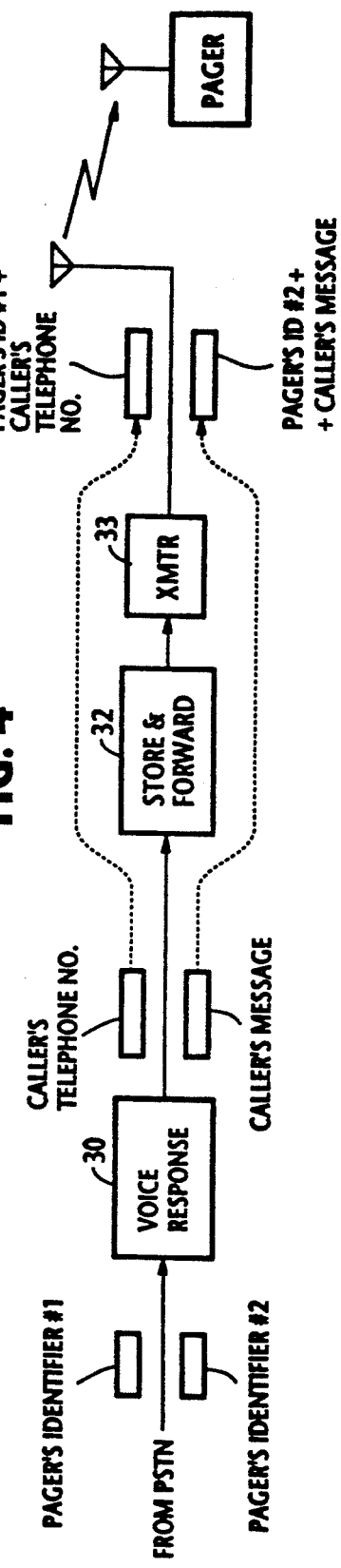
FIG. 4 is a block diagram of a paging system according to the present invention.

When paging a user of the system in a caller's identifier display mode, the calling party sends a pager's identifier #1 to the public switched telephone network through which the signal is passed to a paging system. A voice response is returned from the voice response unit 30 (FIG. 4) of the paging system to the caller urging to send a subsequent signal, the caller's telephone number in this case. On receiving the caller's telephone number, the paging system stores it into the store and forward circuit 32 and receives the pager's identifier #1 from the public switched telephone network (PSTN) and broadcasts the pager's identifier #1 and the telephone number in sequence in a specified code format from the transmitter 33.

When paging the user in a message display mode, the calling party sends a pager's identifier #2 to the public switched telephone network. A connection is established to the same paging system and a voice response is returned from the voice response unit 30, urging the caller to send a subsequent signal, i.e., a caller's message in a series of specified sentence codes. On receiving the message signal, the paging system stores it into the same store and forward circuit 32 as in the former display mode, receives the pager's identifier #2 from the PSTN, and broadcasts the pager's identifier #2 and the message in the specified code format.

Therefore, the caller is not required to dial special symbol codes which are required by the prior art system and the paging system is not required to distinguish between different display modes.

On receiving a paging signal, the controller 4 of the pager executes decision steps 20 and 23 to determine in which display mode the received signal is to be displayed. If the identifier #1 is detected, the caller's telephone number is stored into RAM 5 and displayed on liquid display unit 8. If the identifier #2 is detected, ROM 6 is addressed by controller 4 as a function of the analyzed sentence codes to reconstruct the caller's message, which is then stored into RAM 5 in preparation for display.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A radio display pager comprising:

receive means for receiving a paging signal broadcast from a transmitter station, said paging signal containing a pager's first identifier and a caller's identifier or a pager's second identifier and a message identifier;

decoder means coupled to the receive means for determining whether the received paging signal contains the pager's first identifier or the pager's second identifier;

memory means for storing a plurality of message data;

a display unit; and control means for causing the caller's identifier to be displayed on the display unit if the decoder means determines that the received paging signal contains the pager's first identifier, and for reading one of the message data from the memory means according to the message identifier contained in the received paging signal if the decoder means determines that the received paging signal contains the pager's second identifier and causing the message data read from the memory means to be displayed on the display unit.

2. A method for calling a pager through a switched telephone network, comprising the steps of:

a) allowing a caller to send a pager's first identifier to the network during a first display mode, or a pager's second identifier during a second display mode to the switched telephone network so that a connection is established from the caller to a paging system;

b) returning a voice response to the caller from the paging system urging the caller to dial a caller's identifier during the first display mode or a message identifier during the second display mode;

c) receiving, at said paging system, the pager's first or second identifier from the network and receiving the caller's identifier or message identifier through the established connection and broadcasting the successively received identifiers in a specified line code format from the paging system as a paging signal;

d) receiving, at said pager, the paging signal from the paging system;

e) determining whether the received paging signal contains the pager's first identifier or pager's second identifier;

f) if the paging signal is determined as containing the pager's first identifier, displaying the caller's identifier; and g) if the paging signal is determined as containing the pager's second identifier, reading message data from a memory according to the message identifier to produce a message from the read message data; and h) displaying the message.

* * * * *